United States Patent
Brown et al.

[11] Patent Number: 6,064,818
[45] Date of Patent: May 16, 2000

[54] STRAIGHT PATH OPTIMIZATION FOR COMPILERS

[75] Inventors: Michael Wayne Brown, Georgetown; Aidon Paul Jennery, Round Rock, both of Tex.

[73] Assignee: International Business Machines Corporation, Armonk, N.Y.

[21] Appl. No.: 08/826,851

[22] Filed: Apr. 10, 1997

[51] Int. Cl.[7] ..................................................... G06F 9/45
[52] U.S. Cl. ............................................ 395/709; 395/705
[58] Field of Search .................................... 395/704, 705, 395/708, 709

[56] References Cited

U.S. PATENT DOCUMENTS

| | | | |
|---|---|---|---|
| 4,229,790 | 10/1980 | Gilliland et al. ........................ | 395/587 |
| 4,943,908 | 7/1990 | Emma et al. ............................ | 395/587 |
| 5,050,068 | 9/1991 | Dollas et al. ............................ | 395/382 |
| 5,226,131 | 7/1993 | Grafe et al. ............................. | 395/377 |
| 5,241,635 | 8/1993 | Papadopoulos et al. ................ | 395/377 |
| 5,353,418 | 10/1994 | Nikhil et al. ............................ | 395/678 |
| 5,423,048 | 6/1995 | Jager ....................................... | 395/383 |
| 5,452,457 | 9/1995 | Alpert et al. ............................ | 395/709 |
| 5,499,349 | 3/1996 | Nikhil et al. ....................... | 395/800.26 |
| 5,530,964 | 6/1996 | Alpert et al. ............................ | 395/709 |
| 5,581,762 | 12/1996 | Hayashi et al. ......................... | 395/709 |
| 5,652,889 | 7/1997 | Sites ........................................ | 395/708 |
| 5,659,752 | 8/1997 | Heisch et al. ........................... | 395/704 |
| 5,835,776 | 11/1998 | Tirumalai et al. ...................... | 395/709 |
| 5,857,104 | 1/1999 | Natarjan et al. ........................ | 395/705 |

*Primary Examiner*—James P. Trammell
*Assistant Examiner*—Demetra R. Smith
*Attorney, Agent, or Firm*—Anthony V.S. England; Daniel E. Venglarik; Andrew J. Dillon

[57] ABSTRACT

A pragma is defined to indicate straight path optimization for compilers (SPOC). The pragma is inserted into source code to identify the most common case for a branch point in a program flow, determined by analysis of performance data or simple prediction. The compiler employs this information to optimize the common case as a straight path through the function assembler code, removing unnecessary jumps and the nonoptimized case from the function body. The resulting executable code is more compact and executes faster.

20 Claims, 9 Drawing Sheets

Fig. 1

```
if(day==BLUE_MOON)
{
    fooBlueMoon()
} else
SPOC
{
    fooStandardDay
}
```
⎵ 201

```
testRet = (test==0) ? SPOC TRUE : FALSE;
```
⎵ 203

```
switch(msg)
{
    case WM_SAVEAPPLICATION:
        SaveMyApplication();
        break;

case WM_HITTEST:
        SPOC
        return (hwnd==HWND_DESKTOP) ? SPOC HT_DISCARD : HT_TRANSPARENT;
```
⎵ 205

```
static PBYTE pPath = 0;

if (pPath==0)
NOTSPOC
{
  pPath = allocSharedData (sizeof(MAXPATH));
}
```

```
ULONG func1( ULONG p1, ULONG p2 )         func1 PROC
{
    ULONG Result = 0;                         CMP  EAX, EDX
                                              JBE  @BLBL1
    if( p1 > p2 )
    {                                         MOV  ECX, EAX
        Result = p1;                          JMP  @BLBL2
    }
    else                                  @BLBL1:
    {                                         MOV  ECX, EDX
        Result = p2;
    }                                     @BLBL2:
                                              MOV  EAX, ECX
    return Result;                            RET
}
                                          func1 ENDP
```

*Fig. 4A*

```
ULONG func1( ULONG p1, ULONG p2 )         func1 PROC
{
    ULONG Result = 0;                         CMP  EAX, EDX
                                              JBE  @BLBL1
    if( p1 > p2 )
    SPOC                                      MOV  ECX, EAX
    {
        Result = p1;                      @BLBL2:
    }                                         MOV  EAX, ECX
    else                                      RET
    {
        Result = p2;                      @BLBL1:
    }                                         MOV  ECX, EDX
                                              JMP  @BLBL2
    return Result;
}                                         func1 ENDP
```

*Fig. 4B*

```
ULONG func1( ULONG p1, ULONG p2 )          func1 PROC
{
    ULONG Result = 0;                          CMP  EAX, EDX
                                               JBE  @BLBL1
    if( p1 > p2 )
    SPOC                                   @BLBL2:
    {                                          RET
       Result = p1;
    }                                      @BLBL1:
    else                                       MOV  EAX, EDX
    {                                          JMP  @BLBL2
       Result = p2;
    }                                      func1 ENDP return Result;
}
```

*Fig. 4C*

```
ULONG func1( ULONG p1, ULONG p2 )          func1 PROC
{
    ULONG Result = 0;                          CMP  EAX, EDX
                                               JBE  @BLBL1
    if( p1 > p2 )                              RET
    SPOC
    {                                      @BLBL1:
       Result = p1;                            MOV  EAX, EDX
    }                                          RET
    else
    {                                      func1 ENDP
       Result = p2;
    } return Result;
}
```

STRAIGHT PATH OPTIMIZATION FOR COMPILERS

BACKGROUND OF THE INVENTION

1. Technical Field

The present invention relates in general to creating programs for data processing systems and in particular to mechanisms relating to creating branch conditions within programs for data processing systems. Still more particularly, the present invention relates to a mechanism for utilizing information regarding a straight path from a branch condition to improve program performance.

2. Description of the Related Art

Most contemporary processors support "pipelining," a method of fetching and decoding instructions (preprocessing) in which, at any given time, several program instructions are in various stages of being fetched or decoded. The goal of pipelining is to assure that the processor never waits for instructions; that is, upon completion of each instruction, the next instruction is ready for execution. This feature also enables a processor to look ahead, prefetching instructions and executing them asynchronously or out of order. For processors with multiple execution units, pipelining allows multiple instructions to be executed each cycle.

When a program's flow branches based on a specific condition, such as a parameter value or a flag setting, typically one of the two paths from the branch is selected and the instructions for that path fetched and decoded. If the program flow takes a non-predicted path, however, the processor must discard the pipeline, losing any pipeline performance gains.

Performance tools are available which provide a determination of which paths from a branch are executed most often. This data may be utilized to improve program performance, but require source code modifications to realize performance gains. The situation is further complicated by the different pipelining mechanisms employed by different commercial processors. For the performance gains to be realized across multiple platforms, additional source code modifications and/or multiple versions of the program are required.

It would be advantageous, therefore, to provide an ability in high level programming languages to inform the compiler when a branch path should be designated as the default or "straight" path. It may also be desirable to provide an ability to inform the compiler when a branch path is less frequently selected than other branch paths. In either case, it would be desirable for the mechanism to promote execution speed and to reduce the executable code size.

SUMMARY OF THE INVENTION

It is therefore one object of the present invention to provide an improved method and system for creating programs for data processing systems.

It is another object of the present invention to provide an improved mechanism relating to creating branch conditions within programs for data processing systems.

It is yet another object of the present invention to provide an improved mechanism for utilizing information regarding a straight path from a branch condition to improve program performance.

The foregoing objects are achieved as is now described. A pragma is defined to indicate straight path optimization for compilers (SPOC). The pragma is inserted into source code to identify the most common case for a branch point in a program flow, determined by analysis of performance data or simple prediction. The compiler employs this information to optimize the common case as a straight path through the function assembler code, removing unnecessary jumps and the nonoptimized case from the function body. The resulting executable code is more compact and executes faster.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
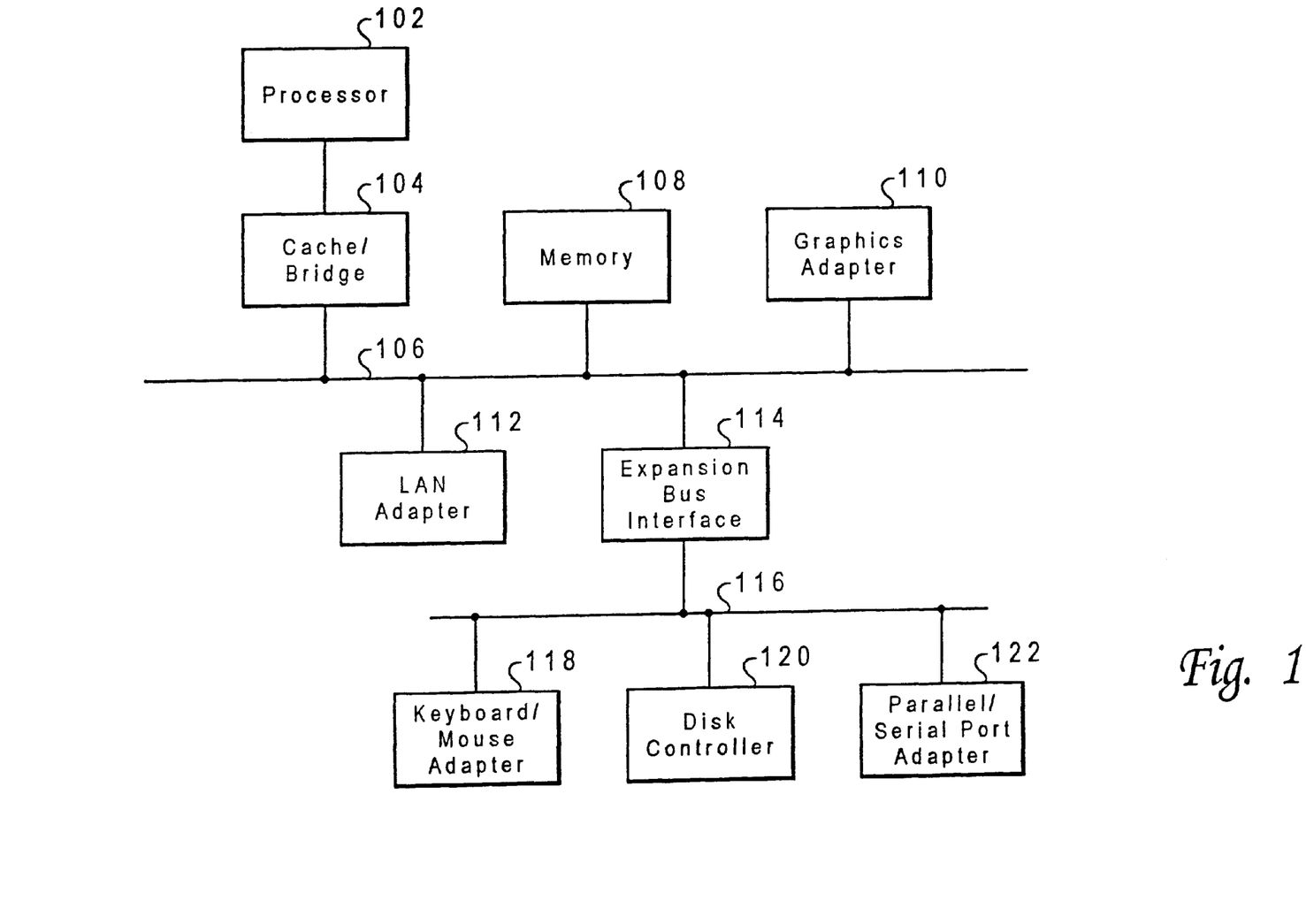
FIG. 1 depicts a data processing system in which a preferred embodiment of the present invention may be implemented.

With reference now to the figures, and in particular with reference to FIG. 1, a data processing system in which a preferred embodiment of the present invention may be implemented is depicted. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a memory-mapped graphics adapter 110.

Other memory mapped peripherals, such as local area network (LAN) adapter 112, may also be connected to local system bus 106. Expansion bus interface 114 connects local system bus 106 to input/output (I/O) bus 116. I/O bus 116 is connected to keyboard/mouse adapter 118, disk controller 120, and parallel/serial ports adapter 122.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural imitations with respect to the present invention.

A data processing system in accordance with a preferred embodiment of the present invention includes a compiler, a program that translates all source code for a program written in a high level programming language into object code, instructions written in an assembler language executable by a processor within the data processing system.

Referring to FIGS. 2A–2D, a source code listing and high level flowcharts illustrating applications for a straight path optimization pragma in accordance with a preferred embodiment of the present invention is portrayed. A pragma, sometimes also called a compiler directive, is a special purpose instruction to the compiler, typically utilized to turn on or off certain features such as stack-checking. Pragmas are generally preferable to comparable compiler options specified at the time of compilation since they are inserted as lines in the source code. Consequently, a pragma cannot be inadvertently omitted when recompiling, although a compiler option may be forgotten. However, the straight path optimization pragma described below may also be implemented as a compiler option.

The straight path optimization pragma of the present invention identifies for the compiler which path should be considered the "straight" path, or the branch path most frequently followed. The pragma is defined for compilers supporting straight path optimization pragmas, for example "#pragma perfhint(straightpath)". If building on a compiler which does not support straight path optimization pragmas, the pragma could be simply defined to nothing, allowing the pragmas to be included in the source code and defined later when the source code is recompiled using a compiler supporting straight path optimization pragmas. Shortcuts for pragmas identifying a straight path optimization for compilers (SPOC) may also be created, for example "#define SPOC #pragma . . . ."

Figure 2A:
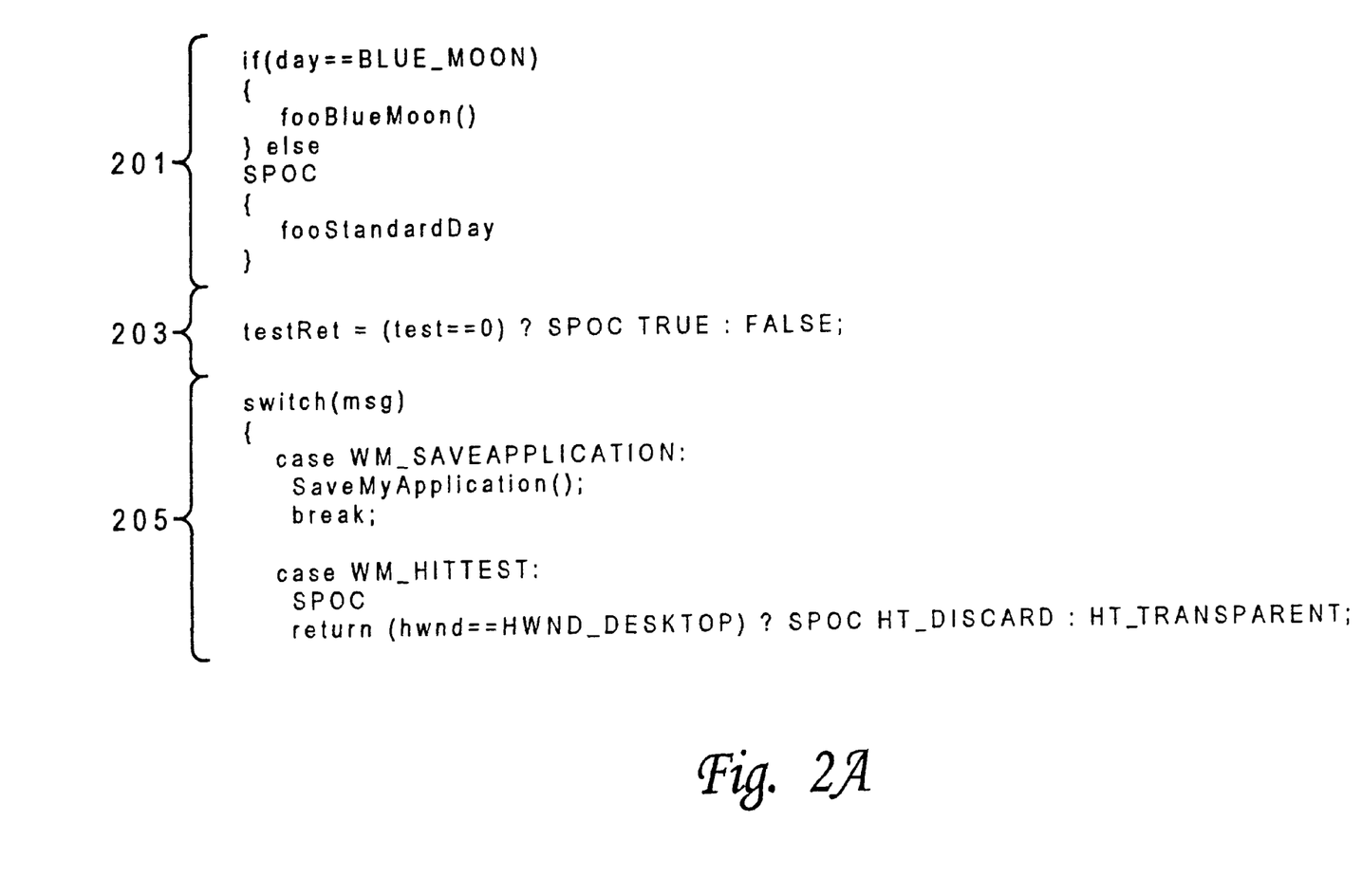
FIGS. 2A–2D are a source code listing and high level flowcharts illustrating applications for a straight path optimization pragma in accordance with a preferred embodiment of the present invention.

After running a performance test, or merely predicting which branch path should be selected as the straight path for optimization, the SPOC define is inserted in the program's source at the top of the branch path, immediately prior to the segment of source code defining that path. A sample C source code listing showing use of the SPOC defined in various programming contexts is depicted in FIG. 2A. The program flow for that code is illustrated in high level flowcharts depicted in FIGS. 2B–2D.

Figure 2B:
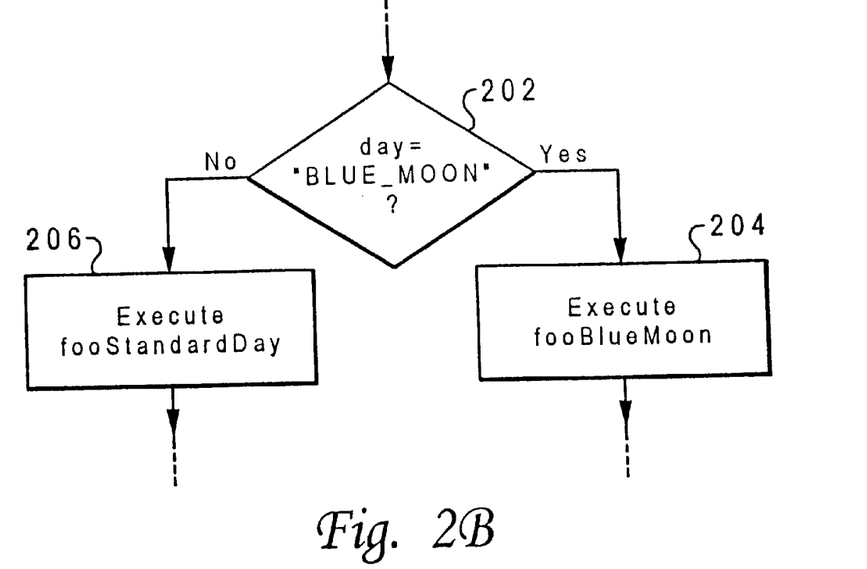

The eight lines of code in section 201 of FIG. 2A form a branch point in the program flow utilizing a conventional if-then-else structure within a routine. The branch, depicted in block 202 of FIG. 2B, is based on a determination of whether the value of variable "day" equals "BLUE_MOON." If so, the program flow passes to block 204, which illustrates execution of the module "fooBlueMoon." Otherwise, the program flow passes to block 206, which depicts execution of the module "fooStandardDay." The SPOC define prior to the "fooStandardDay" alternative defines the path from block 202 to block 206 as the straight path for the compiler The executable or assembly language code generated by the compiler will thus differ, as described below.

Figure 2C:
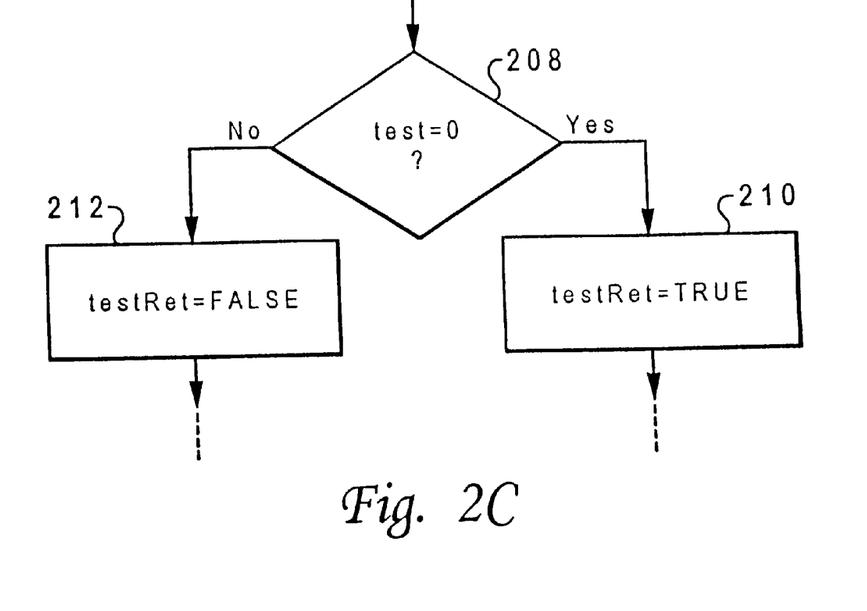

The ninth line of code depicted, in section 203, in FIG. 2A implements a branch point for a test flag value assignment, as depicted in FIG. 2C. The flag ("testRet") is set based on a determination, depicted in block 208, of the value of another variable, "test." If the value of test is zero, the flag is set to TRUE as illustrated in block 210; otherwise the flag is set to FALSE, as depicted in block 212. The SPOC define before the TRUE alternative informs the compiler that the path between block 208 and 210 is the straight or most frequently selected path.

Figure 2D:
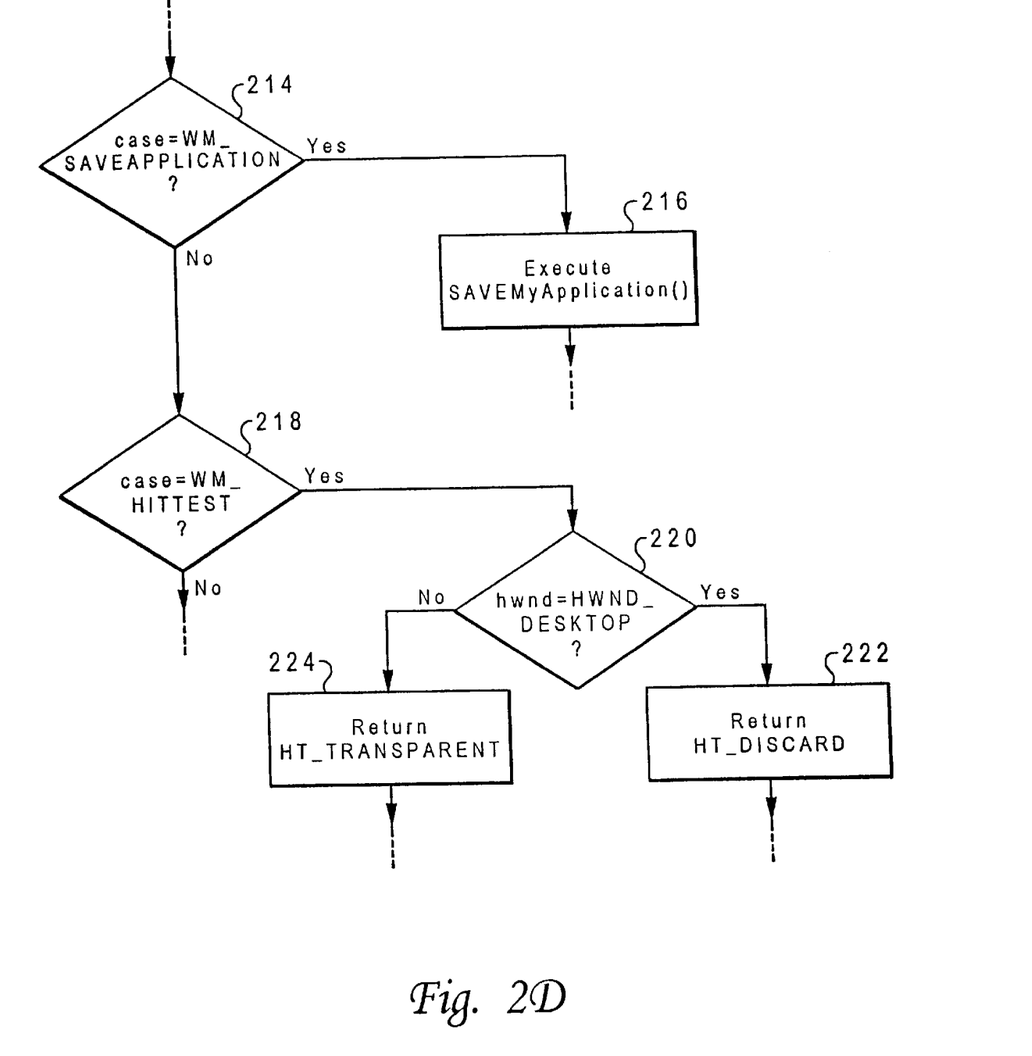

The last eight lines of code depicted in FIG. 2A in section 205 create a branch point within a routine utilizing case conditions, resulting in a program flow depicted in FIG. 2D. The program flow depicted illustrates a series of comparisons 216, 218 which, if matched, result in the program flow branching to corresponding procedures 216, 220. As depicted in step 220, the procedure employed (222 or 224) following a match determination may be conditioned on another comparison. Source code functions utilizing case conditions are typically equivalent to lookups or tables, resulting in a series of comparisons by the executable code. A match for each case in the series is mutually exclusive of matches for other cases, so that when a match is identified the remaining comparisons in the series may be skipped The SPOC define before the most frequently matched case allows the compiler to place the comparison for that case first in the series. A concurrent NOTSPOC define, as described below, before the least frequently matched case would enable the compiler to effectively perform a limited bubble sort on three or more cases, ordering the comparisons within the executable code based to some extent on the frequency of matches.

Figure 3A:
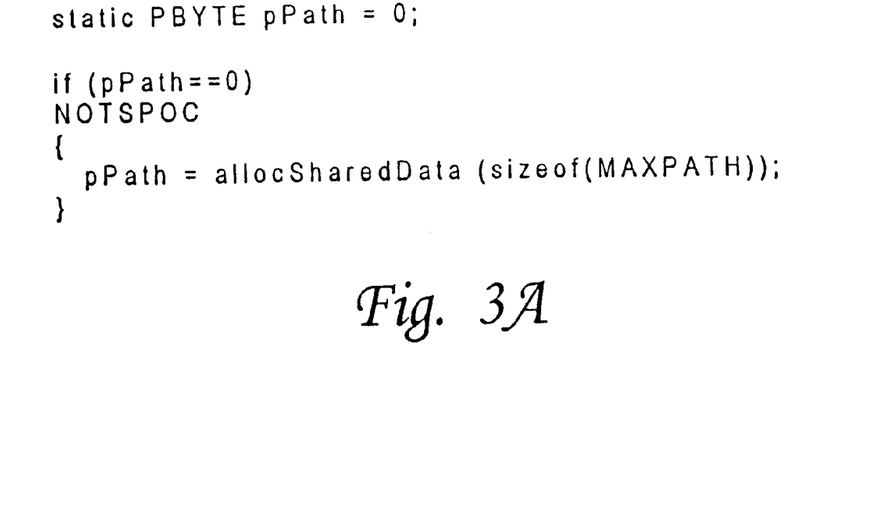
FIGS. 3A–3B depicts a source code listing and high level flowchart demonstrating applications for a complementary straight path optimization pragma in accordance with a preferred embodiment of the present invention.
Figure 3B:
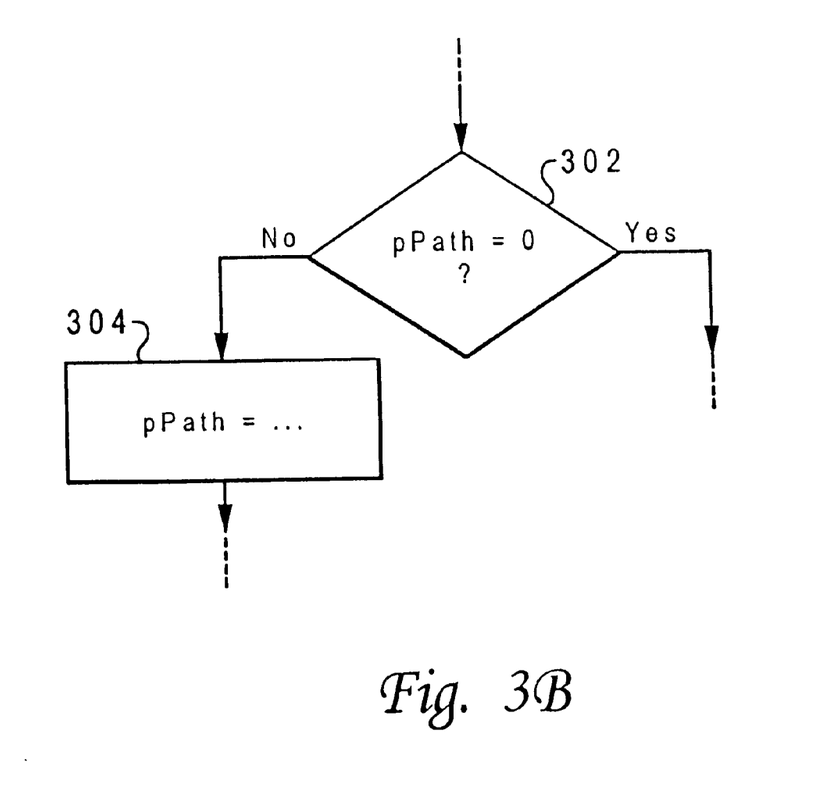

With reference now to FIGS. 3A and 3B, a source code listing and high level flowchart demonstrating applications for a complementary straight path optimization pragma in accordance with a preferred embodiment of the present invention are depicted. The complementary straight path optimization pragma, NOTSPOC, is employed to indicate to the compiler that a path from the branch is not the straight path. The NOTSPOC define is inserted prior to the source code segment for the nonoptimized or least frequently selected path from the branch. FIG. 3A depicts a source code listing demonstrating use of the NOTSPOC define, while FIG. 3B illustrates the program flow for that source code. The branch point of the program flow, depicted at block 302, involves a determination of whether the value of variable pPath is zero. If not, the program passes to block 304, which illustrates setting the value of pPath to the value of a counter MAXPATH. The NOTSPOC define identifies the path from block 302 to block 304 as not being the straight path, or the least frequently or least commonly employed branch path. A SPOC/NOTSPOC-enabled compiler may thus utilize this information in generating executable code. The NOTSPOC pragma may prove particularly useful in applications where the source code requires more than two paths from a branch point in the program flow.

Referring to FIGS. 4A–4D, listings of source code and corresponding assembly code for various compilations by a compiler supporting straight path optimization pragmas in accordance with a preferred embodiment of the present invention are illustrated. These simple examples demonstrate the general effect of the invention on executable code produced by a SPOC/NOTSPOC enabled optimizing compiler. The source code is written for the IBM Visual Age C/C++ optimizing compiler for OS/2 using the optimized _Optlink calling convention and demonstrating cases where the SPOC and/or NOTSPOC pragmas could be employed. The resulting assembler code is for the Intel x86 family of processors.

Figure 4A:
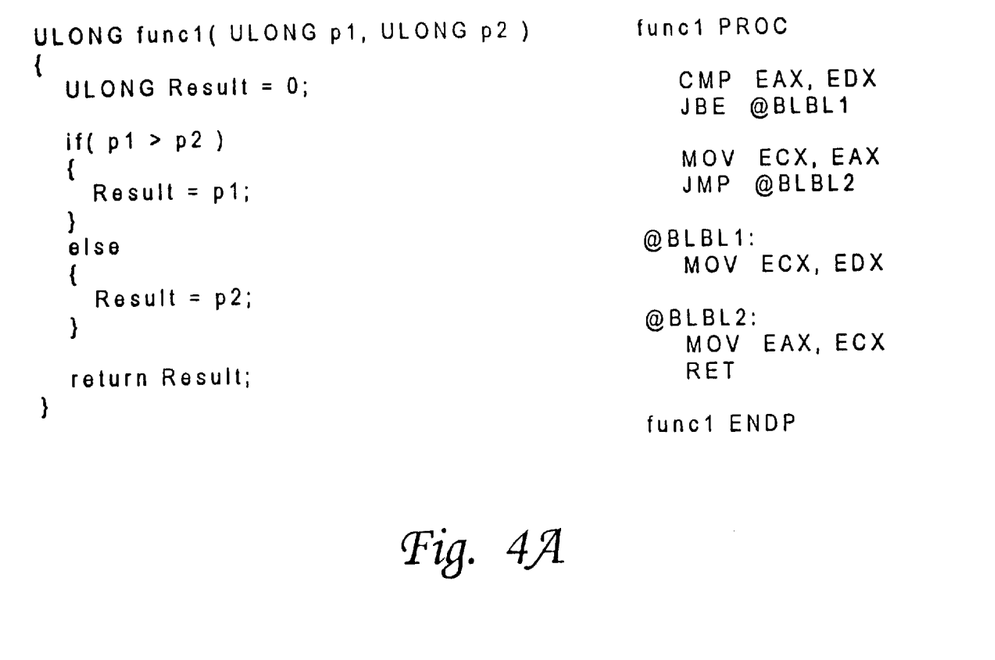
FIGS. 4A–4D are listings of source code and corresponding assembly code for various compilations by a compiler supporting straight path optimization pragmas in accordance with a preferred embodiment of the present invention.

FIG. 4A depicts source code for a simple routine comparing two values, p1 and p2, and returning the larger of the pair. Even when optimized, this source will produce the corresponding assembler output depicted in FIG. 4A. The assembler code comprises a total of seven instructions.

Assuming that the case p1>p2 is the most common result of the function, the "straight" path requires execution of six instructions and other alternative requires execution of five instructions.

Figure 4B:
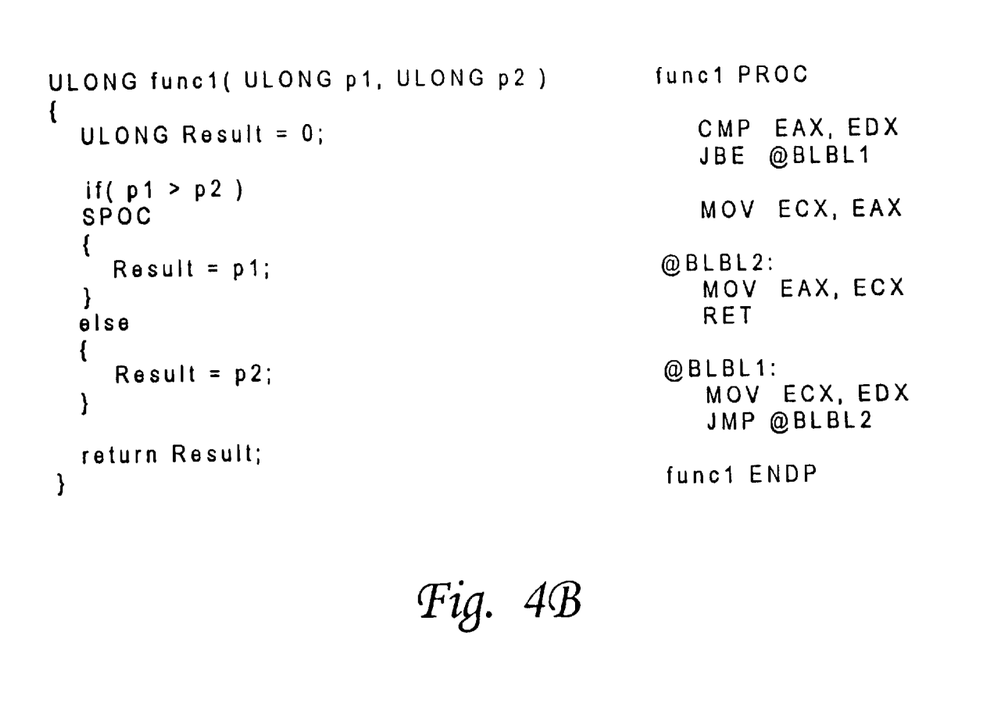

In FIG. 4B, the SPOC pragma is introduced into the same function source code as is depicted in FIG. 4A to inform the compiler that the path for the case p1>p2 is to be straight-path optimized. The compiler, upon encountering the SPOC define, removes instructions unique to the nonoptimized case (the branch path least frequently selected) from the function body and places them above or below the function body. Only instructions unique to the common case identified by the SPOC define or shared by both cases remain within the function body. Thus, the common case branch path forms a straight path through the function, requiring only execution of sequential instructions within the body of the function until the program flow returns from the function. The conditional jump forming the branch point within the function is directed to the instructions for the nonoptimized case, which are placed either entirely outside the function body or, at a minimum, outside the sequential executable instructions comprising the straight path case. A jump back into the function body from the nonoptimized instructions in the depicted example allows the function to return from the nonoptimized case.

The resulting assembler code shown in FIG. 4B comprises a total of seven instructions, with the straight path requiring execution of five instructions and the alternative path requiring execution of six instructions. Thus, the straight path, which is selected most frequently, has eliminated an instruction. Since the alternative path has a corresponding additional instruction, these performance gains from the SPOC pragma may appear nominal, particularly where straight path execution is a thin majority over the alternative path. However, numerous contexts arise in which the straight path of a program flow will be selected a very large majority of times. Also, more complex routines will permit larger reductions in the instruction size of the straight path. More importantly, the nonoptimized case has been "taken out" of the function. The optimized case is now a straight path through the function requiring no jumps.

The example depicted in FIG. 4B may be further optimized by a compiler's built-in register optimization algorithms. This would produce the executable code illustrated in FIG. 4C, where the number of total instructions has been reduced to five. Unnecessary movement of values between registers is eliminated. The straight path now requires execution of only three instructions, and the nonoptimized case requires execution of only five instructions. The unnecessary jump has been removed from the optimized or common case.

Figure 4C:
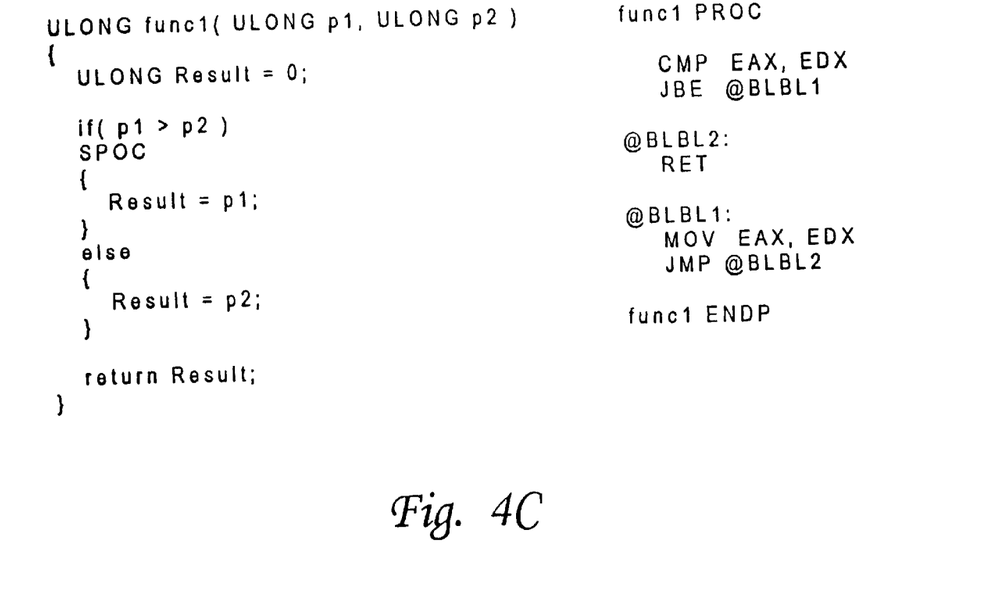
Figure 4D:
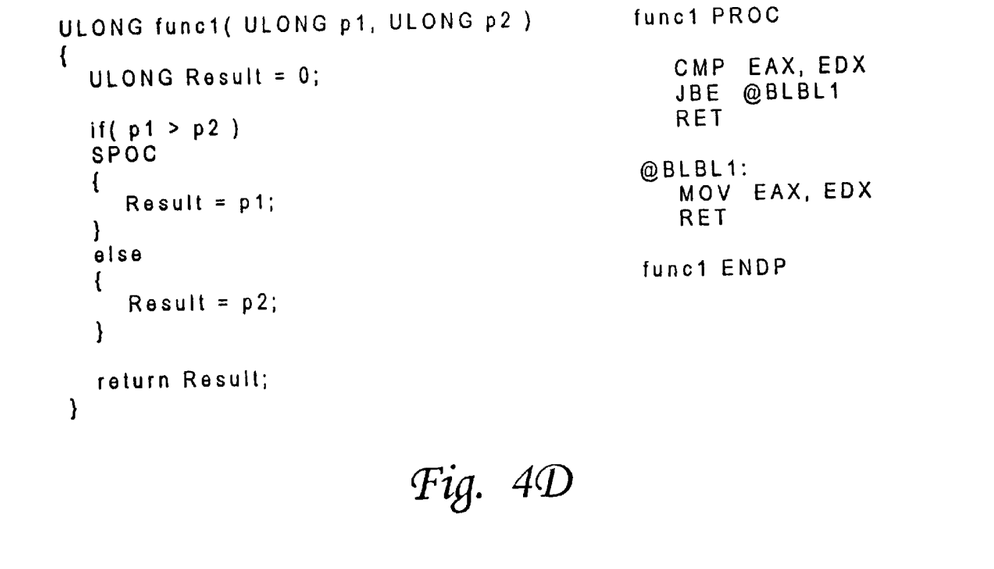

The assembler code in FIG. 4C contemplates a compiler only capable of inserting one return (RET) instruction in each function. Further optimization is possible by introducing multiple return instructions, such as depicted in the assembler code in FIG. 4D. With multiple return instructions, a jump back into the function body from the nonoptimized instructions is no longer required. Instead, the function may return directly from the nonoptimized instructions. The total number of instructions for the function remains five, and the straight path still requires execution of three instructions. However, the instruction size for the nonoptimized case and now requires execution of only four instructions.

Even with the simple example illustrated in FIGS. 4A–4D, the total function size is reduced from seven instructions to five. The straight path has dropped from six to three instructions, with unnecessary jumps removed. The alternative path has even eliminated an instruction, allowing both paths to be executed faster. The same principle illustrated may be employed for a complementary straight path optimization pragma (NOTSPOC). Any code in a NOTSPOC block would be "removed" from the function body and placed either above or below, allowing the common case to be straight pathed through the function.

Figure 5:
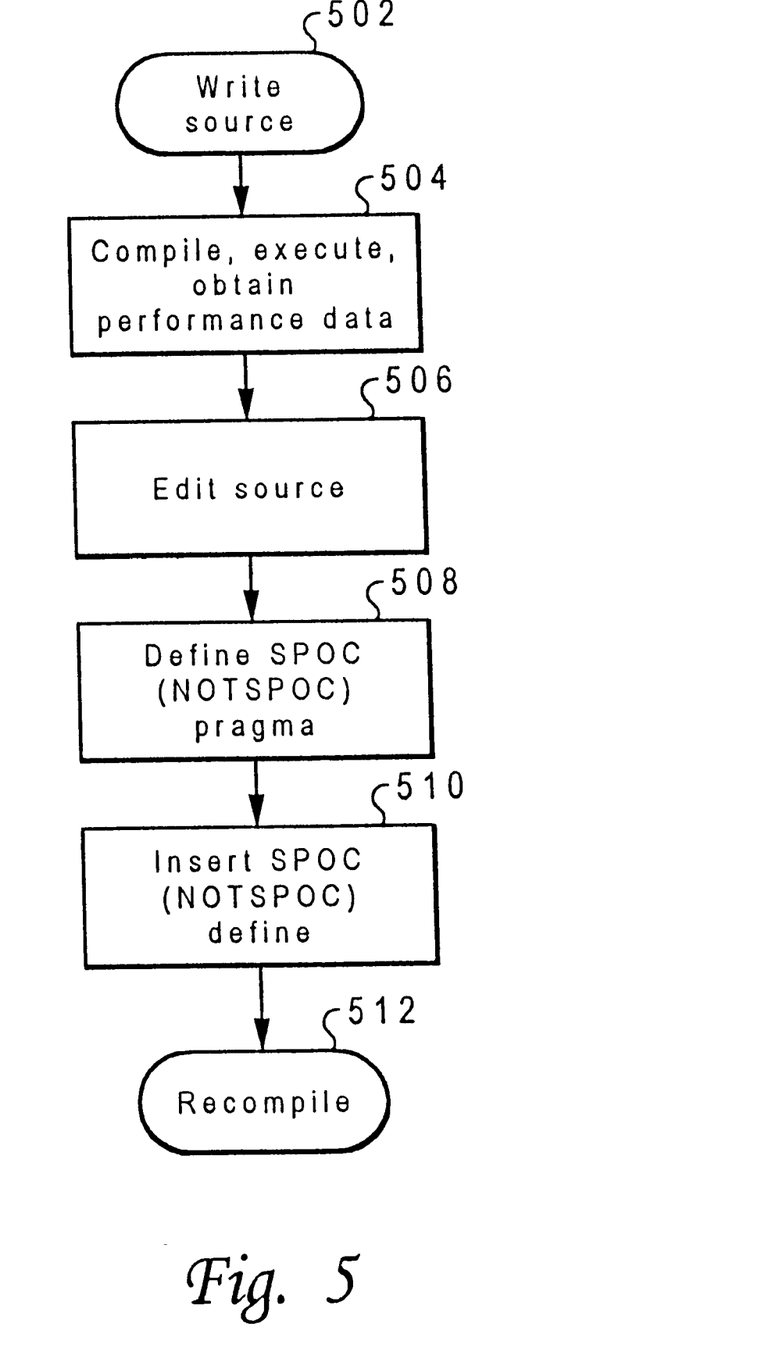
FIG. 5 depicts a high level flowchart for a process of employing straight path optimization pragmas in accordance with a preferred embodiment of the present invention.

With reference now to FIG. 5, a high level flowchart for a process of employing straight path optimization pragmas in accordance with a preferred embodiment of the present invention is depicted. The process begins at step 502, which depicts writing the source code for a program. The process next passes to step 504, which illustrates compiling the source, executing the program under test conditions, and obtain performance data. The process then passes to step 506, which depicts editing the source code for the program, and then to step 508, which illustrates defining a straight path optimization pragma (SPOC) and optionally a complementary straight path optimization pragma (NOTSPOC). The process passes next to step 510, which illustrates inserting a SPOC define before the common case path from a branch instruction, and/or a NOTSPOC define before the nonoptimized case. The process then passes to step 512, which depicts recompiling the source code for the program.

Figure 6:
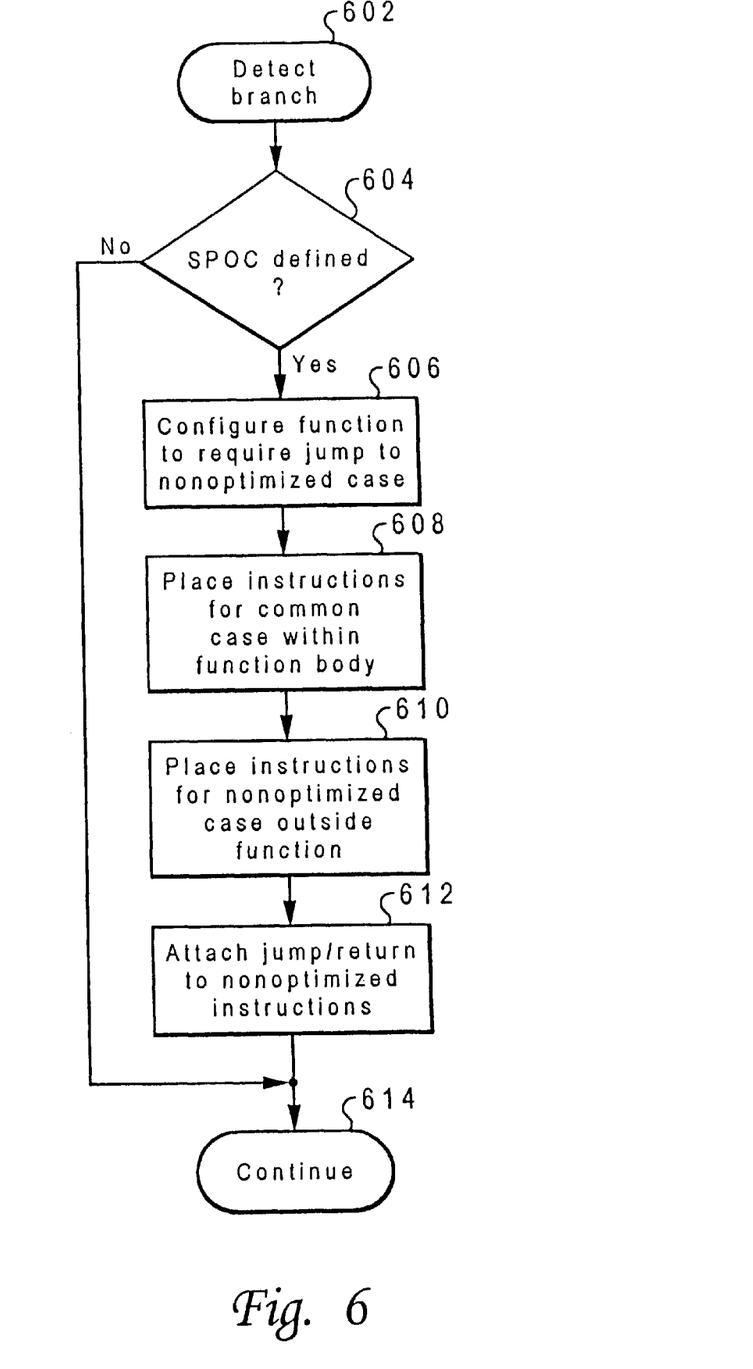
FIG. 6 is a high level flowchart for a process of handling straight path optimization pragmas in accordance with a preferred embodiment of the present invention.

Referring to FIG. 6, a high level flowchart for a process of handling straight path optimization pragmas in accordance with a preferred embodiment of the present invention is depicted. The process begins at step 602, which depicts a compiler detecting a branch while compiling source code. The process then passes to step 604, which illustrates a determination of whether a straight path optimization (SPOC) pragma has been defined for one of the branch paths. If not, the process simply proceeds to step 614, which illustrates the compiler continuing to compile the source code. If so, however, the process passes to step 606, which depicts the compiler configuring the function to require any conditional jump to be made to the nonoptimized case. This may require reordering operands so that a subsequent conditional jump is executed only if the nonoptimized case is satisfied. The conditional jump directs program execution to a segment of executable instructions other than a subsequent adjacent segment. If the circumstances upon which the jump is conditioned are not satisfied, program execution continues with the subsequent adjacent segment of executable instructions by default.

The process next passes to step 608, which illustrates placing the instructions for the common case branch path, identified by the SPOC define, within the function body (in the subsequent adjacent segment of executable instructions, which terminate with a return instruction completing execution of the function), and then to step 610, which depicts placing the instructions unique to the nonoptimized case outside the function body. The process then passes to step 612, which illustrates attaching to the nonoptimized instructions either a jump back to the function body or a return instruction completing the nonoptimized path of the function. The process passes next to step 614, which depicts the compiler continuing to compile the source code.

By employing straight path optimization pragmas, the present invention informs the compiler as to which branch path is most often selected The compiler accordingly structures the executable code to allow the common case to follow a straight path through the function, with instructions unique to the alternative branch path removed from the body of the function. Jump instructions within the function body are therefore unnecessary. A separate return instruction may be employed in the nonoptimized path.

The present invention allows performance data to be employed to generate executable code which is more compact and runs faster. Fewer mispredicted branches in superscalar processors will result in improved overall performance. The present invention may optionally be utilized to create a tool employing performance data to automatically modify the source code, inserting SPOC pragmas at appropriate locations. Thus, a programmer could obtain almost instant pipelining performance gains.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of implementing straight path optimization for compilers, comprising:

within source code for a program, inserting a compiler directive at a beginning of source code for a selected path from a branch within the program, wherein the compiler directive designates a path from among at least two alternative paths from the branch to be straight path optimized; and responsive to detecting the compiler directive during compilation of the source code, generating sequential executable instructions for a path designated to be straight path optimized by the compiler directive and placing the generated executable instructions immediately following the branch within executable instructions for the program, wherein executable instructions for the program are straight path optimized.

2. The method of claim 1, further comprising:

employing the compiler directive to identify a most frequently utilized path from the branch within the program.

3. The method of claim 1, further comprising:

employing the compiler directive to identify a least frequently utilized path from a branch within the program.

4. The method of claim 1, wherein the step of inserting a compiler directive further comprises:

inserting a straight path pragma at a beginning of source code for a most frequently utilized path from the branch.

5. The method of claim 1, wherein the step of inserting a compiler directive further comprises:

inserting a complementary straight path pragma at a beginning of source code for a least frequently utilized path from the branch.

6. The method of claim 1, wherein the step of generating sequential executable instructions further comprises:

generating sequential executable instructions for the path from a source code segment immediately following the compiler directive.

7. The method of claim 1, wherein the step of generating sequential executable instruction further comprises:

generating sequential executable instruction for the path from a source code segment other than a source code segment immediately following the compiler directive.

8. The method of claim 1, wherein the step of generating sequential executable instruction further comprises:

generating a conditional executable instruction directing program execution to a segment of executable instructions other than a subsequent adjacent segment of executable instructions; and generating executable instructions for completing a most frequently utilized path within the subsequent adjacent segment of executable instructions.

9. An apparatus for implementing straight path optimization for compilers, comprising:

editing means for inserting, within source code for a program, a compiler directive at a beginning of source code for a selected path from a branch within the program, wherein the compiler directive designates a path from among at least two alternative paths from the branch to be straight path optimized; and compiler means, responsive to detecting the compiler directive during compilation of the source code, for generating sequential executable instructions for a path designated to be straight path optimized by the compiler directive and placing the generated executable instructions immediately following the branch within executable instructions for the program, wherein executable instructions for the program are straight path optimized.

10. The apparatus of claim 9, wherein the editing means further comprises:

means for employing the compiler directive to identify a most frequently utilized path from the branch within the program.

11. The apparatus of claim 9, wherein the editing means further comprises:

means for employing the compiler directive to identify a least frequently utilized path from a branch within the program.

12. The apparatus of claim 9, wherein the editing means further comprises:

editing means for inserting a straight path pragma at a beginning of source code for a most frequently utilized path from the branch.

13. The apparatus of claim 9, wherein the editing means further comprises:

editing means for inserting a complementary straight path pragma at a beginning of source code for a least frequently utilized path from the branch.

14. The apparatus of claim 9, wherein the compiler means further comprises:

means for generating sequential executable instructions for the path from a source code segment immediately following the compiler directive.

15. The apparatus of claim 9, wherein the compiler means further comprises:

means for generating sequential executable instruction for the path from a source code segment other than a source code segment immediately following the compiler directive.

16. The apparatus of claim 9, wherein the compiler means further comprises:

means for generating a conditional executable instruction directing program execution to a segment of executable instructions other than a subsequent adjacent segment of executable instructions; and means for generating executable instructions for completing a most frequently utilized path within the subsequent adjacent segment of executable instructions.

17. A computer program product for use with a data processing system, comprising:

a computer usable medium containing source code instructions for a program;

a compiler directive within the source code at a beginning of a source code segment for a selected path from a branch within the program, wherein the compiler directive designates a path from at least two alternative paths from the branch to be straight path optimized, and wherein a compiler, responsive to detecting the compiler directive during compilation of the source code, generates sequential executable instructions for a path designated to be straight path optimized by the compiler directive and places the generated executable instructions immediately following the branch within executable instructions for the program.

18. The computer program product of claim 17, wherein the computer usable medium is a hard disk drive.

19. The computer program product of claim 17, wherein the computer usable medium is a floppy disk.

20. The computer program product of claim 17, wherein the computer usable medium is a CD-ROM.

* * * * *